March 8, 1938.                C. L. HILL                 2,110,226
                          RUBBER COVERED CHAIN
                           Filed Aug. 29, 1936

CHARLES L. HILL,
            INVENTOR.
BY Ely & Pattison,
            ATTORNEYS.

WITNESS:

Patented Mar. 8, 1938

2,110,226

UNITED STATES PATENT OFFICE 2,110,226

RUBBER COVERED CHAIN

Charles L. Hill, Plainfield, N. J., assignor to Charles T. Dickey, Elizabeth, N. J.

Application August 29, 1936, Serial No. 98,534

7 Claims. (Cl. 59—78)

This invention relates to rubber covered chains and method of making the same.

One of the features of the invention resides in a rubber covered chain in which a rubber covering conforms to the general shape of the links of the chain which it encloses to provide an undulated exterior surface, and wherein the spaces within the links of the chain are entirely filled with rubber to produce a solid unitary structure which is sufficiently flexible for bending purposes. Whereas the rubber covered chain may be used for many purposes, I have found that it is exceptionally useful for the construction of anti-skid chains for motor vehicles, due to its tractive and wear qualities.

Another feature of the invention is to provide a novel method of manufacture of my rubber covered chain to effect a bond between the rubber covering and the metal links of the chain to prevent accidental shifting of one with respect to the other.

Another feature of the invention is the provision of a novel method of manufacturing rubber covered chains in which the rubber covering is originally applied to the chain while in tubular form, and subsequently collapsed throughout its entire length to conform to the general shape of the links of the chain, and which collapsed rubber covering is vulcanized while in such fully collapsed position to provide a covering for the chain wherein the spaces within the links thereof are entirely filled.

A further feature of the invention is to provide a method of manufacturing rubber covered chain which is simple, inexpensive, and rapid when practiced.

Other features of the invention will appear as the following specification is read in conjunction with the accompanying drawing, in which.

Figure 1:
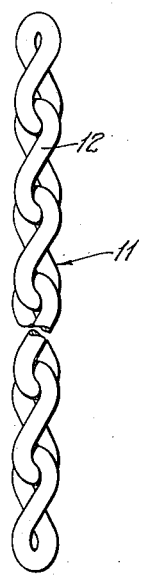
Figure 1 is a side edge elevational view of a length of chain.

Referring to the drawing by reference characters the numeral 10 designates a length of my rubber covered chain in its entirety which includes a central flexible chain core 11 composed of a plurality of connected links 12. Enclosing the chain core 11 is a solid covering of rubber 13, the exterior surface of which substantially conforms to the general shape of the connected chain links 12. The open portions of the links 12 are filled with rubber webs 14 which form an integral structure with the outer covering. The rubber covering 13 and webs 14 are formed about the chain by a novel method of manufacture presently to be described.

Figure 8:
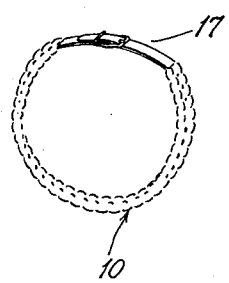
Figure 8 is a perspective view illustrating an anti-skid chain made up of a length of my rubber covered chain.

The substantial conforming of the shape of the outer rubber covering 13 with the links 12 of the chain produces a uniform exterior undulated surface containing humps 15 and valleys 16 which provide an efficient tread surface when lengths of the rubber covered chain 10 are made into an automobile anti-skid chain 17 such as shown in Figure 8 of the drawings.

Whereas various methods may be employed in the manufacture of my rubber covered chain 10, I shall describe one of such methods but I do not wish to be limited thereto.

The method which I have selected for making the rubber covered chain 10 consists in first cleaning the chain length 11 free of oil, grease, dirt or other foreign matter. The bare length of chain 11 is shown in Figure 1 and when in this form, the same is subjected to a cleaning operation by any commercial cleaner used in the various arts preparatory to a plating operation.

After the length of chain has been thus cleaned of oil and other foreign matter, the same is plated with a brass composition which I have found is inducive to the formation of a perfect bond between the links of the chain and the rubber covering subsequently to be applied. Such method of preparing metal for the attachment of vulcanized rubber is well known in such art, and a good example of the same is that known as the "Daft" process.

Figure 2:
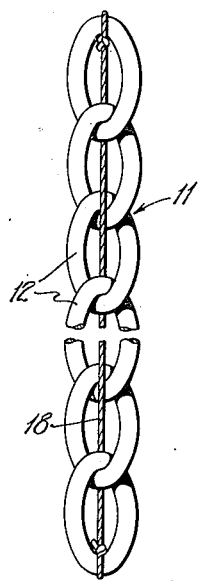
Figure 2 is a side elevational view of the chain shown in Figure 1, but looking at right angle thereto and illustrating the end links joined by a flexible element which is threaded through the intermediate links.

In Figure 2 of the drawing, I have illustrated the next step in my process which consists in tying the ends of a length of cord 18 to the outer end of the end links 12 of the chain 11. The intermediate portions of the cord 18 are threaded through the intermediate links 12. The cord 18 and chain 11 are taut when the chain is in a suspended position as shown in Figure 2.

Figure 3:
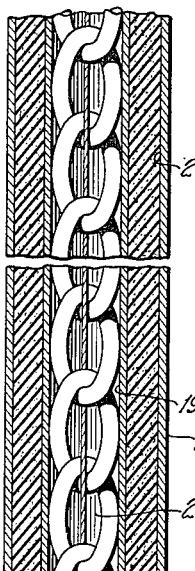
Figure 3 is a vertical sectional view through the discharge end of a rubber tubing extruding machine illustrating the manner in which the rubber covering is initially applied to a length of chain.

The length of chain as illustrated in Figure 2 is next fed through an extruding machine of the conventional type employed for extruding rubber tubing. In Figure 3 of the drawing I have illustrated the discharge end of an extruding machine of this kind which includes spaced inner and outer vertically disposed concentric tubular walls 19 and 20 respectively. The inner tubular wall 19 defines a central chain passage 21 and terminates just short of the reduced lower open end 22 of the outer tubular wall 20. The space between the two tubular walls 19 and 20 constituting a tubular passage 23 for the passage of unvulcanized rubber. In practice, the chain 11 as illustrated in Figure 2 of the drawing is fed downwardly through the center passage 21 of the extruding machine in timed relation to the extrusion of the rubber at the restricted outlet 22, the rubber being forced downwardly under pressure through the passage 23. Thus by reference to Figure 3, it will be seen that by passing the length of chain through a tubular rubber extruding machine, that the chain is enclosed in a tubular sheath 24 as it passes from the discharge end of the said machine.

Figure 4:
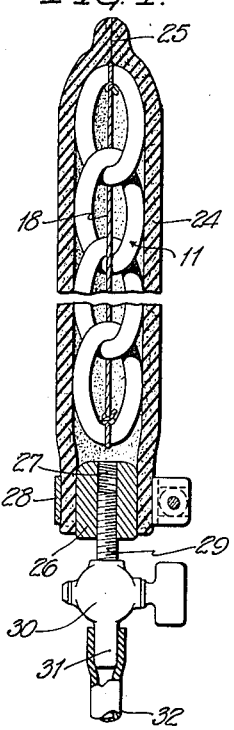
Figure 4 is a vertical sectional view of the rubber covering while in tubular form prior to its collapse about the links of a chain.

After a length of chain emerges from the extruding machine, one end of the rubber tubular sheath 24 is sealed as at 25 by applying benzine or the like to the inner walls of the said end, after which the raw rubber is squeezed together as illustrated in Figure 4 of the drawing.

The next step in the method is to effect a complete collapse of the tubular sheath 24 and this is accomplished by first inserting a plug 26 in the open end of the tubular sheath, the said plug having a central threaded bore 27. A collar clamp 28 embraces the exterior walls of the open end of the tubular sheath to firmly secure the plug in position therein. Threaded to the bore 27 is the threaded nipple 29 of a manually operable valve 30. The valve 30 also includes a hose nipple 31 to which one end of a vacuum hose line 32 is connected. The other end of the hose line 32 is connected with a vacuum pump or other like source of vacuum. By turning the valve 30 to the "on" position, the inside of the sealed tubular sheath will be evacuated of air and the vacuum is of such strength as to cause a collapse of the walls of the tubular sheath. As the walls collapse, they are drawn tight about the links of the chain and through the spaces therein, the cord 18 serving to act as a means of maintaining an open bore throughout the length of the tubular sheath to assure a complete collapse of the same throughout.

Figure 6:
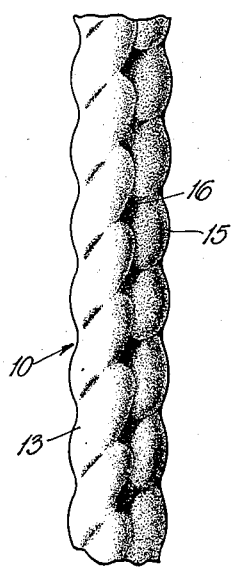
Figure 6 is a perspective view of a length of the finished article.
Figure 7:
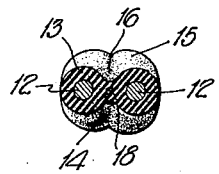
Figure 7 is a detail horizontal sectional view through the completed article.
Figure 5:
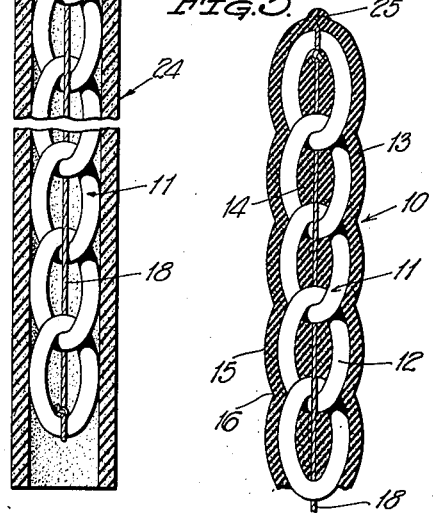
Figure 5 is a vertical sectional view through a length of rubber covered chain in its completed form.

After collapsing of the tubular sheath, the valve 30 is shut off and the hose 32 disconnected from the nipple 31. With the tubular sheath still in collapsed condition due to the vacuum therein, the length of rubber covered chain is placed in a vulcanizing oven and left therein until vulcanized, whereupon the rubber covered chain appears as shown in Figures 5 to 7 inclusive. When removed from the vulcanizing oven, the collar clamp 28, plug 26, and valve 30 are removed and the open end of the length of rubber covering to which these parts are connected may be cut off.

Rubber covered chain manufactured in accordance with the method hereinbefore described produces an article such as shown in Figure 5 of the drawing. The treatment of the bare chain prior to the application of the rubber covering causes a bond to be formed between the metallic surfaces of the links and the rubber, and combined with the fact that all spaces within the links are filled with rubber the chain and rubber covering cannot shift relative to each other. The rubber covering 13 providing a tough rubber cushion tread surface for the chain, and whereas, rubber covered chain may be used for other purposes, I have in mind, the use of the same in the manufacture of antiskid chains such as shown conventionally in Figure 8 of the drawing.

While I have shown and described what I consider to be the preferred embodiment of my invention, it will be understood that I do not wish to be restricted thereto, for such changes and modifications as come within the scope of the appended claims may be resorted to if desired.

Having thus described the invention, what I claim as new and desire to secure by Letters Patent of the United States, is:—

1. An article of the class described comprising a length of chain, and a rubber covering enclosing said chain and filling the space within the links thereof, the outer surface of said rubber covering conforming substantially to the shape of the links thereof.

2. An article of the class described comprising a flexible metallic link element, and a rubber covering enclosing said flexible metallic link element and of an external shape conforming substantially to the contour of the links of said chain and filling the spaces within the links of said link element to provide a relatively stiff flexible rubber covered article.

3. An article of the class described comprising a flexible metallic link core, a rubber covering enclosing said link core and of an external shape conforming substantially to the contour of said link core and bonded to the metallic surfaces of the same.

4. An article of the class described comprising an elongated stiff flexible rubber body and a length of link chain embedded within said rubber body and enclosed thereby, the external shape of said flexible rubber body conforming substantially to the contour of the links of said link chain.

5. An article of the class described comprising a length of open link chain, and a flexible rubber covering enclosing said chain and of an external shape conforming substantially to the contour of the links of said chain and having integral web portions extending through the open links of said chain.

6. An article of the class described comprising a length of open link chain, the links of said chain being normally taut, and a flexible rubber covering enclosing said chain and conforming substantially to the shape thereof to provide an undulant outer surface, said rubber covering having integral web portions filling the spaces within said open links.

7. An article of the class described comprising a length of normally taut chain, a rubber covering enclosing said chain and having an outer surface conforming substantially to the shape of the links thereof, and means integral with said rubber covering passing through the links of said chain for arresting longitudinal movement of said rubber covering relative to said chain.

CHARLES L. HILL.